(No Model.)  3 Sheets—Sheet 1.
J. T. BAKER.
ADJUSTING DEVICE FOR HARVESTERS.
No. 328,273. Patented Oct. 13, 1885.
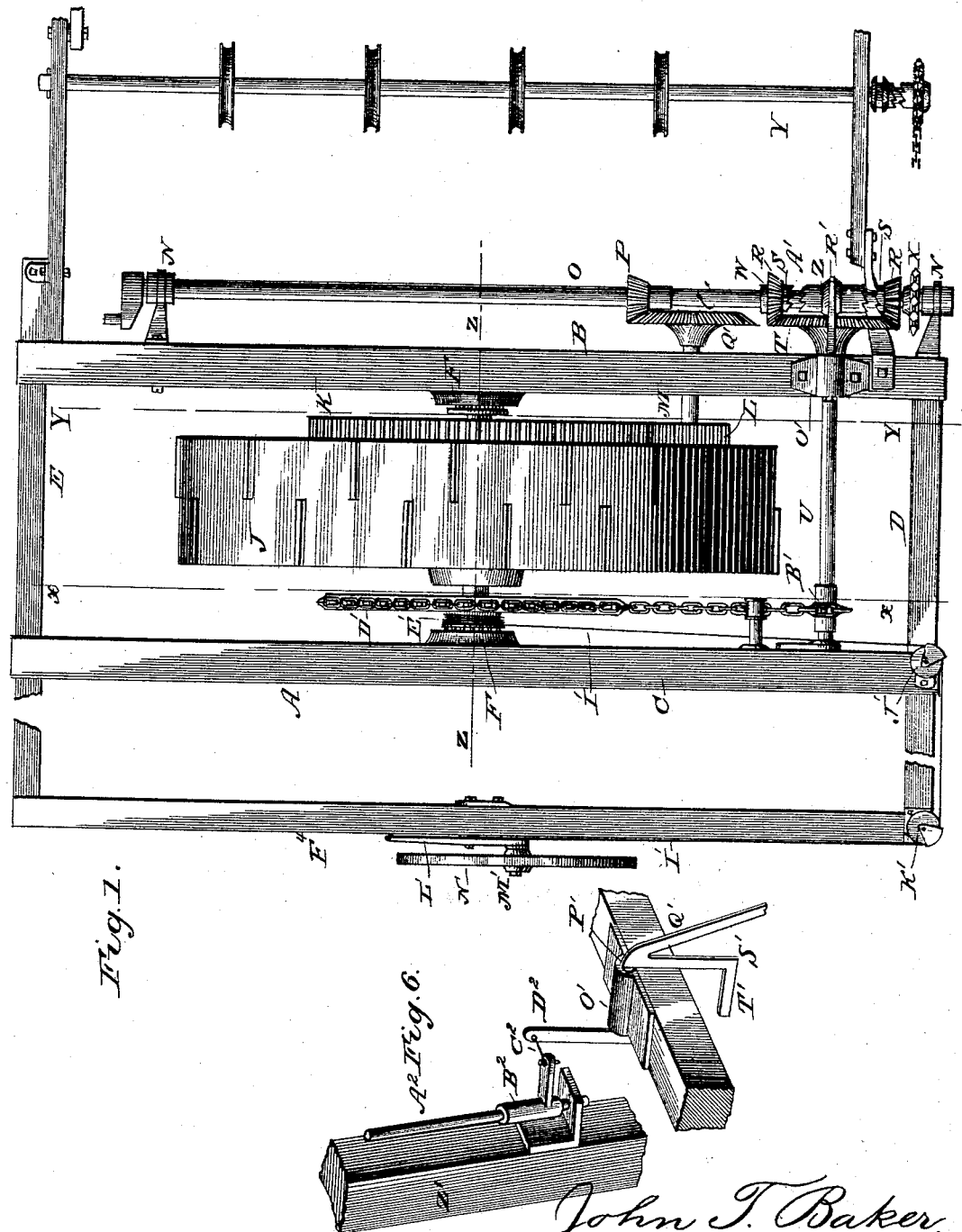
WITNESSES:
Fred G. Dieterich
Wm. Bagger
John T. Baker,
INVENTOR.
by Louis Bagger & Co,
ATTORNEYS.

(No Model.) 3 Sheets—Sheet 2.
J. T. BAKER.
ADJUSTING DEVICE FOR HARVESTERS.
No. 328,273. Patented Oct. 13, 1885.
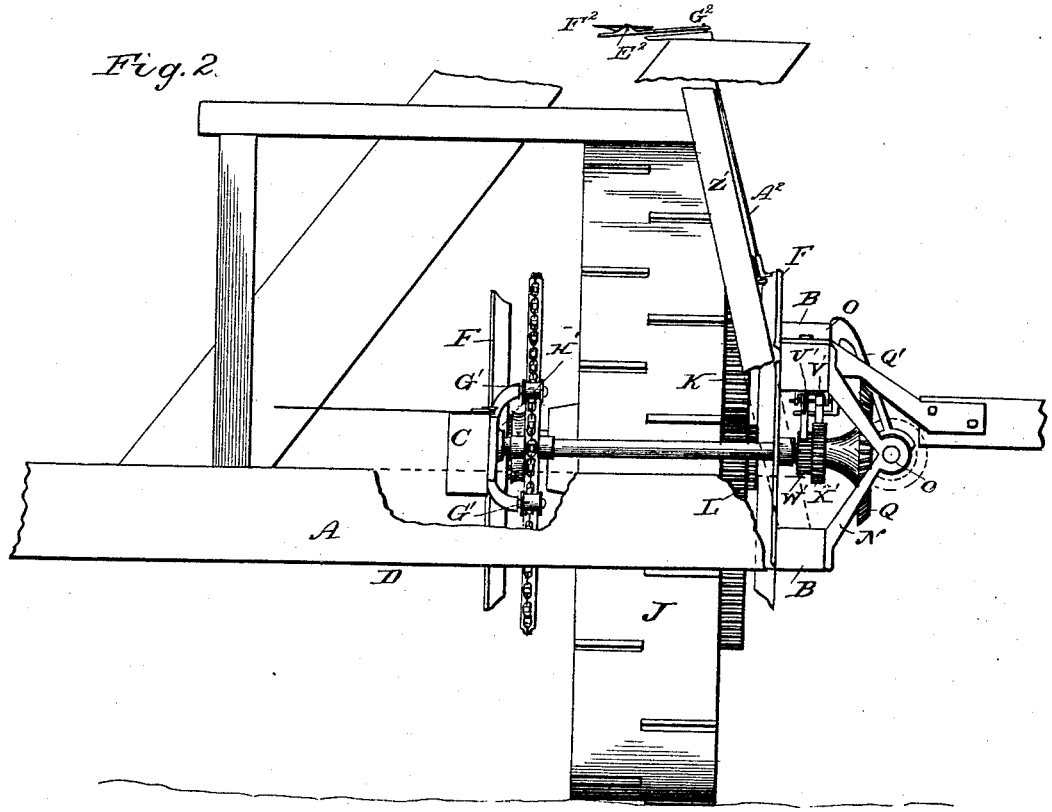
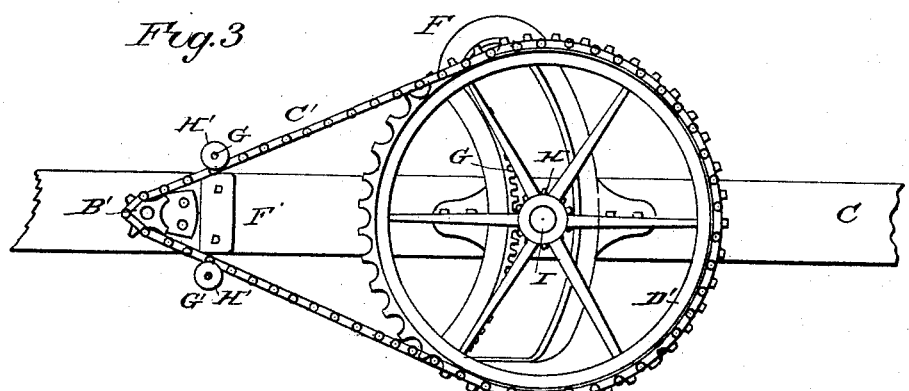
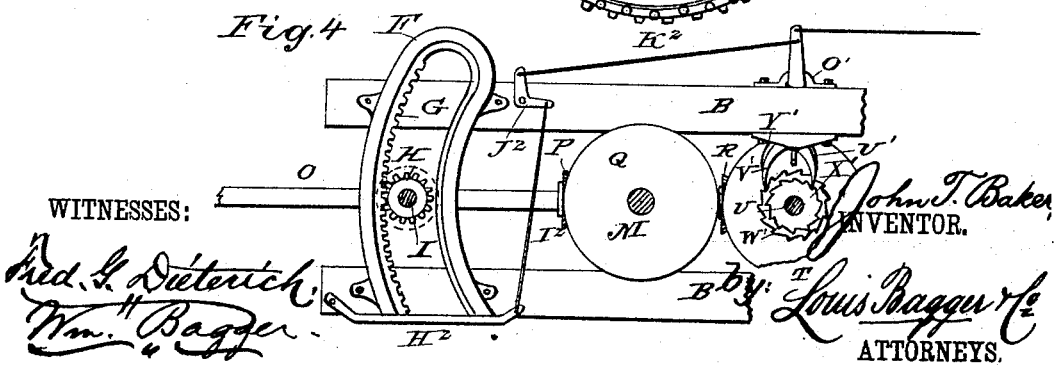
WITNESSES:
Fred. L. Dieterich
Wm. H. Bagger
INVENTOR
John T. Baker
by Louis Bagger & Co.
ATTORNEYS.

(No Model.)
J. T. BAKER.
ADJUSTING DEVICE FOR HARVESTERS.
No. 328,273. Patented Oct. 13, 1885.
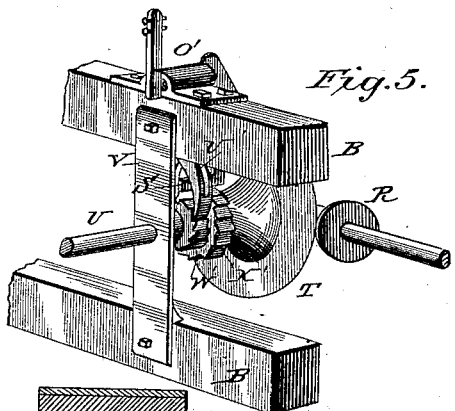
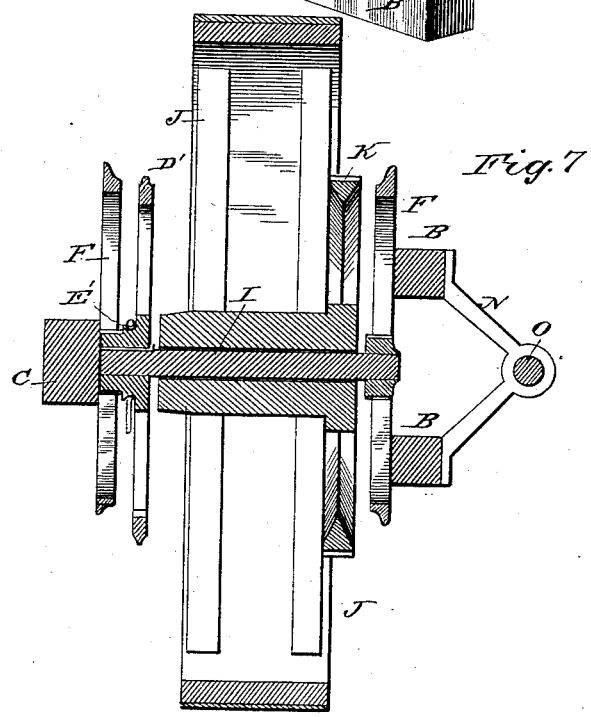
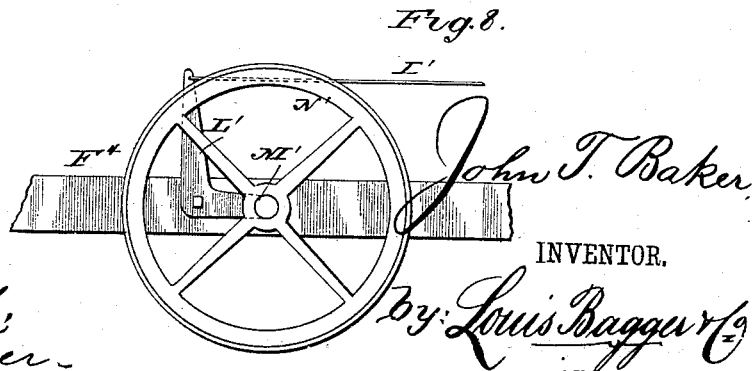
WITNESSES:
Fred. G. Dieterich
Wm. Bagger
INVENTOR.
John T. Baker
by Louis Bagger & Co
ATTORNEYS.

UNITED STATES PATENT OFFICE.

JOHN T. BAKER, OF LEE'S SUMMIT, MISSOURI.

ADJUSTING DEVICE FOR HARVESTERS.

SPECIFICATION forming part of Letters Patent No. 328,273, dated October 13, 1885.

Application filed December 22, 1884. Serial No. 150,929. (No model.)

*To all whom it may concern:*

Be it known that I, JOHN T. BAKER, a citizen of the United States, and a resident of Lee's Summit, in the county of Jackson and State of Missouri, have invented certain new and useful Improvements in Adjusting Devices for Harvesters; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of such portions of a harvester as are necessary to illustrate my invention, showing my improvements attached thereto. Fig. 2 is a rear view of certain parts of the harvester-frame having my invention attached thereto. Fig. 3 is a longitudinal sectional elevation taken on the line $x\,x$ in Fig. 1, and looking in the direction of the dart crossing the said line. Fig. 4 is a sectional elevation taken on the line $y\,y$ in Fig. 1, and looking in the direction of the dart crossing the said line, showing the chain-tightening device. Fig. 5 is a perspective detail view of the reversing-gear. Fig. 6 is a detail view of the mechanism for operating the reversing-gear and throwing the adjusting mechanism into or out of operation. Fig. 7 is a transverse sectional view taken on the line $z\,z$ in Fig. 1; and Fig. 8 is an elevation of a portion of the grain end of the frame, showing the arrangement of the grain-wheel.

The same letters refer to the same parts in all the figures.

This invention relates to harvesters and grain-binders, and it has for its object to provide improved mechanism whereby machines of this class, or, more properly, the frames carrying the operating mechanism of the same, may be automatically raised or lowered with relation to the transporting mechanism and retained at the position to which adjusted, this result being effected solely by the driving mechanism of the machine during its ordinary progress during operation.

The immediate object of the invention is to produce mechanism for the purposes stated, which shall possess superior advantages in point of simplicity, durability, and general efficiency; and with these ends in view the invention consists in the improved construction and arrangement of parts, which will be hereinafter fully described, and particularly pointed out in the claims.

In the drawings hereto annexed, A designates the frame of a harvester equipped with my improvements, and consisting of side sills, B B and C, rear sill, D, and front sill, E, which said rear and front sills are provided with lateral extensions forming the frame of the grain-table, the outer ends of said extensions being provided with the connecting-beam $F^4$, to which the grain-wheel is attached, as will be hereinafter more fully described.

The side beams, B B and C, of the main frame are provided on their inner adjoining sides with segmentally-slotted castings F F, the rear convex edges of which are provided with teeth or cogs G G, engaging pinions H H, that are secured firmly upon the ends of the main shaft of the machine, which said main shaft is designated by letter I, and carries the main transporting and driving wheel J. The latter revolves loosely upon the said shaft or axle, and is provided on one side with a spur-wheel, K, meshing with a pinion, L, mounted upon the inner end of a short shaft, M, which is journaled in suitably-arranged boxes or bearings between the side beams B B of the frame. The said side beams B B are also provided with laterally-extending boxes or hangers N N, forming bearings for a longitudinal shaft, O, having a pinion, P, which engages a bevel-gear, Q, upon the outer end of the shaft M.

Upon the shaft O, near the rear end of the same, are arranged a pair of pinions, R R, facing each other, and provided on their adjoining faces with ratchet-collars S S, the teeth of which are faced in opposite directions. Both pinions R R mesh with a bevel-wheel, T, mounted upon a transverse shaft, U, which is journaled in suitable boxes in the beam or sill C and in a brace, V, connecting the sills B B, as shown, and the said pinions are kept constantly in contact with the said bevel-wheel by a collar, W, fixed upon the said shaft and bearing against the foremost pinion, and a chain-wheel, X, fixed upon the shaft and bearing against the rear pinion. From the chain-wheel X motion is communicated to the sheave-buncher, a portion of which is shown at Y in Fig. 1 of the drawings.

Z designates a clutch-sleeve, which is feathered upon the shaft O, so as to revolve with the latter, while it may slide thereon, and provided at its ends with teeth A', adapted to engage the ratchet-collar S S of the pinions R R, between which the said sleeve is arranged. The means for manipulating the said sleeve will be presently hereinafter described.

The other or inner end of the transverse shaft U is provided with a small chain-wheel, B', connected by a chain, C', with a large chain-wheel D', which is firmly secured upon the main shaft of the machine, and which is constructed in one piece with a sheave or pulley, E', and with one of the pinions H, to which reference has already been made. The side beam or sill C is provided on its inner side with a chain-tightener or device for keeping the drive-chain C' taut at any position to which the drive-wheel and main shaft may be adjusted. This device consists simply of a block or plate, F', having lateral inwardly-extending pintles G' G', on which are journaled friction-pulleys H' H', bearing against the upper and lower sides of the chain. It follows that when the main shaft of the machine, with its attachments, moves vertically in the segmentally-slotted castings (as will be hereinafter more fully described) one or the other side of the chain will be correspondingly strained so as to keep it taut. It will be understood, of course, that in order to cause the spur-wheel K and pinion L to remain in mesh at all times the shaft M of the said pinion must be concentric with the segmental slots in the castings F, while the shaft U is eccentrically disposed with relation to the slots in the said castings; hence the necessity for the chain-tightening device, which, as will be seen, is simple in construction and entirely automatic in its operation.

To the sheave or pulley E' is attached a wire rope or chain, I', which passes over a horizontal pulley, J', at the rear corner of the beam C, thence over a horizontal pulley, K', at the rear corner of the beam F$^4$, along the latter, and to a bell-crank lever, L', which is pivoted by a stud or pin at its fulcrum in a tubular sleeve fitted in the said beam. The chain I' is made fast to the long upright arm of the said bell-crank lever, and the short horizontal arm of the latter is provided with a stud, M', upon which the grain-wheel N' is journaled. It will be seen that by this construction when the main shaft is caused to revolve so as to descend in the segmental castings in the act of raising or lifting the frame the chain or rope I' will be wound upon the sheave or pulley E', thus pulling the long arm of the bell-crank lever L' and lowering its short arm, thus lowering the grain-wheel with relation to the frame in the same proportion that the latter is raised with reference to the main transporting-wheel, the sizes of the sheave E' and lever L' being of course suitably proportioned for this purpose.

Secured upon the upper side of the frame-beam B directly above the transverse shaft U is a box, O', forming a bearing for a short transverse shaft, P', one end of which is provided with a diagonally-downward-extending arm, Q', which is bifurcated at its lower end and fitted in a groove, R', in the clutch-sleeve Z, which may be thereby manipulated. The same end of the shaft P' is also provided with a downward-extending arm, S', the lower end of which has an inwardly-extending finger, T', which is arranged between a pair of dogs or pawls, U' and V', engaging, respectively, a pair of ratchet-wheels, W' and X', with which they are held in contact by suitable light springs, Y'. These dogs or pawls, while the machine is at work, serve to retain the frame in the position to which it may have been adjusted vertically by preventing the shaft U from revolving in either direction. When it is desired to either raise or lower the frame, the appropriate pawl, U' or V', is disengaged from its ratchet by the action of the finger T' of arm S', as will be presently described.

To one of the side beams, Z', of the elevator-frame of the machine is journaled a shaft, A$^2$, having at its lower end a crank, B$^2$, which is connected by a suitable rod, C$^2$, with a crank, D$^2$, extending upwardly from the inner end of the shaft P'. The upper end of the shaft A$^2$ is provided with an operating crank or handle, E$^2$, having a spring-latch, F$^2$, adapted to engage a notch in a segment-plate, G$^2$, which is suitably secured to the top of the beam Z', and which said retaining-notch is so located that when the latch engages it the intermediate connecting and operating mechanism shall have adjusted the clutch-sleeve Z between the collars S S and out of engagement with either.

H$^2$ is a lever pivoted to the inner side of the lower side beam B, adjoining the lower end of the segment F, and adapted to be struck by the pinion H, traveling in the said segment, when it reaches the limit of its downward motion. Said lever is connected by a rod, I$^2$, with one arm of a bell-crank, J$^2$, pivoted to the upper frame-beam, B, and the other arm of which is connected by a rod, K$^2$, with the arm D$^2$ of rock-shaft P', which is by this mechanism automatically reversed when the limit of the downward motion of pinion H has been reached, thus avoiding breakage in the act of hoisting the machine.

The operation of this invention is as follows: In order to hoist or raise the frame of the machine, the handle E$^2$ of the shaft A$^2$ is moved, so as to turn the said shaft and cause the operation of the rock-shaft P' in such a direction that the arm S' T' will disengage the dog or pawl U' from the ratchet-wheel W', while simultaneously the arm Q' moves the clutch-sleeve into engagement with the clutch upon the rear pinion, R. The shaft O, which is actuated by the mechanism P, Q, M, L, K, and J, constantly revolves, when the machine is in motion, in the direction indicated in the drawings by an arrow, thus imparting motion, in the direction indicated by arrows, to the pinion R, at the rear end of shaft O, bevel-gear T, shaft U, chain-wheels and chain B' D' C', and to the main shaft I, upon which latter the said chain-wheel D' and the pinions H H are firmly secured, as stated. This will cause the said pinions to engage the racks G of the segmentally-slotted plates F, thus traveling downward in the said racks and lifting the latter, together with the frame of the machine, to which they are attached. At the same time the rope or chain I' is wound upon the sheave E', thus actuating, in the manner already set forth, the bell-crank lever carrying the grain-wheel, and raising or lifting the grain end of the machine. When the pinions H H reach the lower ends of their respective racks, one of them will strike or engage the lever H², lowering the latter and causing it to actuate, through the mechanism already described, the arm D² of rock-shaft P', turning the latter so as to cause its arm Q' to move the clutch-sleeve Z back to its original central position. This operation serves, of course, simultaneously to return the shifting rod or shaft A² and its handle to their respective original positions, where they are retained by the latch F², which automatically drops into its notch.

To lower the frame of the machine, the shifting-rod is turned in the opposite direction, bringing the front end of the clutch-sleeve into engagement with the forward pinion R, whereby the several operating parts are caused to operate in the reverse direction of that already described, causing the pinions H H to travel in an upward direction in their respective segments and lowering the frame. The lowering being effected, however, principally by the weight of the frame, enables the forward clutch to be constructed, as herein shown, with the beveled sides of the teeth facing each other in the direction of revolution, so as to be more in the nature of a friction device. By thus constructing the clutch breakage is avoided when the limit of motion has been reached, because the sleeve Z will then become automatically disengaged from the clutch and the shifting-rod be thrown back to its original or central position.

It is obvious that when the sleeve Z is moved forwardly for the purpose of lowering the machine it is the dog or pawl V' which is disengaged from its ratchet-wheel X', while the dog U' remains in engagement with its ratchet W'.

From the foregoing description, taken in connection with the drawings hereto annexed, the operation and advantages of this invention will be readily understood.

The general construction is simple, and the invention may be applied at a moderate expense to harvesting and grain-binding machines of ordinary construction.

The operation is automatic, and requires no expenditure of power on the part of the driver, within convenient reach of whose seat the handle of the shifting-rod is located.

It is obvious that in the practical manufacture of this device various changes with regard to the construction of details may be deemed desirable or necessary; and I would therefore have it understood that I do not limit myself to the precise construction herein set forth and described, but reserve to myself the right to all such modifications as may be resorted to without departing from the spirit of my invention.

I would here state that one of the modifications which I may find it desirable to employ relates to the omission of the chain-tightening device. In lieu of this two separate chains may be employed, running over sprocket-wheels upon a shaft which is arranged concentrically with the segmentally-slotted plates.

Having thus described my invention, I claim and desire to secure by Letters Patent of the United States—

1. In a device for adjusting harvester-frames, the combination, with suitable actuating mechanism, of the longitudinal shaft O, loose pinions R R, having clutch-collars upon their inner adjoining ends or faces, the shaft U, bevel-gear T, engaging both pinions R, sliding double clutch-sleeve Z, having groove R', rock-shaft P', having arm Q', the shifting-rod A², and mechanism connecting the latter with the rock-shaft P', substantially as and for the purpose herein shown and specified.

2. The combination of the shaft U, ratchet-wheels W' X', having teeth facing in opposite directions, pawls U' V', rock-shaft P', having arm S' T', and mechanism connecting the said rock-shaft with the shifting-rod A², substantially as and for the purpose herein shown and specified.

3. The combination of the shaft O, having loose pinions R R, provided with clutch-collars S S, the sliding double clutch Z, shaft U, having bevel-gear T and ratchet-wheels W' X', the pawls U' V', rock-shaft P', having arms Q', S', T', and D², mechanism connecting arm D² with a crank upon the lower end of the shifting-rod A², the lever H², bell-crank J², connecting-rods J² and K², the segmental slotted rack-plates F F, axle I, having fixed pinions H H, the loose drive-wheel J, driving-gear connecting the latter with the shaft O, and a chain connecting the shaft U with the axle I, all arranged and operating substantially as and for the purpose herein set forth.

4. The combination of the axle having pinions arranged to travel in segmentally-slotted rack-plates, the chain-wheel D' upon the said axle, shaft U, arranged eccentrically to the said segmental guide-plates, having chain-wheel B', drive-chain C', and the chain-tightening device secured to a frame-beam, C, and consisting of a plate having arms or pintles, on which are journaled friction-wheels arranged to bear against the upper and lower sides of the drive-chain, substantially as and for the purpose herein shown and specified.

In testimony that I claim the foregoing as my own I have hereunto affixed my signature in presence of two witnesses.

JOHN T. BAKER.

Witnesses:
W. F. LEWIS,
Z. McFADDEN.